US012783016B2

(12) United States Patent
Kanas et al.

(10) Patent No.: US 12,783,016 B2
(45) Date of Patent: Nov. 3, 2026

(54) REMOVABLE HINGE CAPS

(71) Applicant: Hewlett-Packard Development Company, L.P., Spring, TX (US)

(72) Inventors: Derek Kyle Joseph Kanas, Spring, TX (US); Tony Seokhwa Moon, Spring, TX (US); Michael John Bugos, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 131 days.

(21) Appl. No.: 18/873,624

(22) PCT Filed: Jul. 29, 2022

(86) PCT No.: PCT/US2022/038860

§ 371 (c)(1),
(2) Date: Dec. 10, 2024

(87) PCT Pub. No.: WO2024/025557

PCT Pub. Date: Feb. 1, 2024

(65) Prior Publication Data

US 2025/0362718 A1 Nov. 27, 2025

(51) Int. Cl.
*G06F 1/16* (2006.01)

(52) U.S. Cl.
CPC .......... *G06F 1/1681* (2013.01); *G06F 1/1679* (2013.01)

(58) Field of Classification Search
None
See application file for complete search history.

(56) References Cited

U.S. PATENT DOCUMENTS

| | | | | |
|---|---|---|---|---|
| 10,054,981 | B2 * | 8/2018 | Nakamura | G06F 1/166 |
| 11,474,570 | B2 * | 10/2022 | Lee | G06F 1/1652 |
| 12,081,687 | B2 * | 9/2024 | Mody | H04M 1/022 |
| 12,256,033 | B2 * | 3/2025 | Fu | H04M 1/0268 |
| 12,298,819 | B2 * | 5/2025 | Rhee | G06F 1/1652 |
| 2010/0012671 | A1 | 1/2010 | Vrondran et al. | |
| 2011/0047754 | A1 * | 3/2011 | Takahashi | H04M 1/0216 16/342 |
| 2011/0094766 | A1 | 4/2011 | Cheng et al. | |
| 2020/0409427 | A1 * | 12/2020 | Hsu | G06F 1/1681 |
| 2021/0026407 | A1 * | 1/2021 | Park | G06F 1/1618 |
| 2021/0048852 | A1 * | 2/2021 | Hsu | B25G 3/38 |
| 2022/0121248 | A1 * | 4/2022 | Lee | G09F 9/301 |

FOREIGN PATENT DOCUMENTS

GB 2511282 A 9/2014

* cited by examiner

*Primary Examiner* — Xanthia C Relford
(74) *Attorney, Agent, or Firm* — Quarles & Brady LLP

(57) ABSTRACT

In some examples, a hinge assembly can include a hinge bar including a rotation axis, a lock cam including a protrusion, the lock cam located coaxially with the rotation axis of the hinge bar, and a removable hinge cap to cover the hinge bar and the lock cam where the removable hinge cap includes a lock flange, and where the protrusion is located adjacent to the lock flange to prevent translation of the removable hinge cap relative to the hinge bar when the lock cam is in a lock position.

15 Claims, 8 Drawing Sheets

REMOVABLE HINGE CAPS

BACKGROUND

Computing devices utilize display devices to display information to a user. Such information may be presented to a user for various purposes, such as for work, retail, education, gaming, multimedia, and/or other general purposes. The display devices may be viewed in different orientations based on a type of display device, a type of use, user preferences, etc.

DETAILED DESCRIPTION

Figure 1:
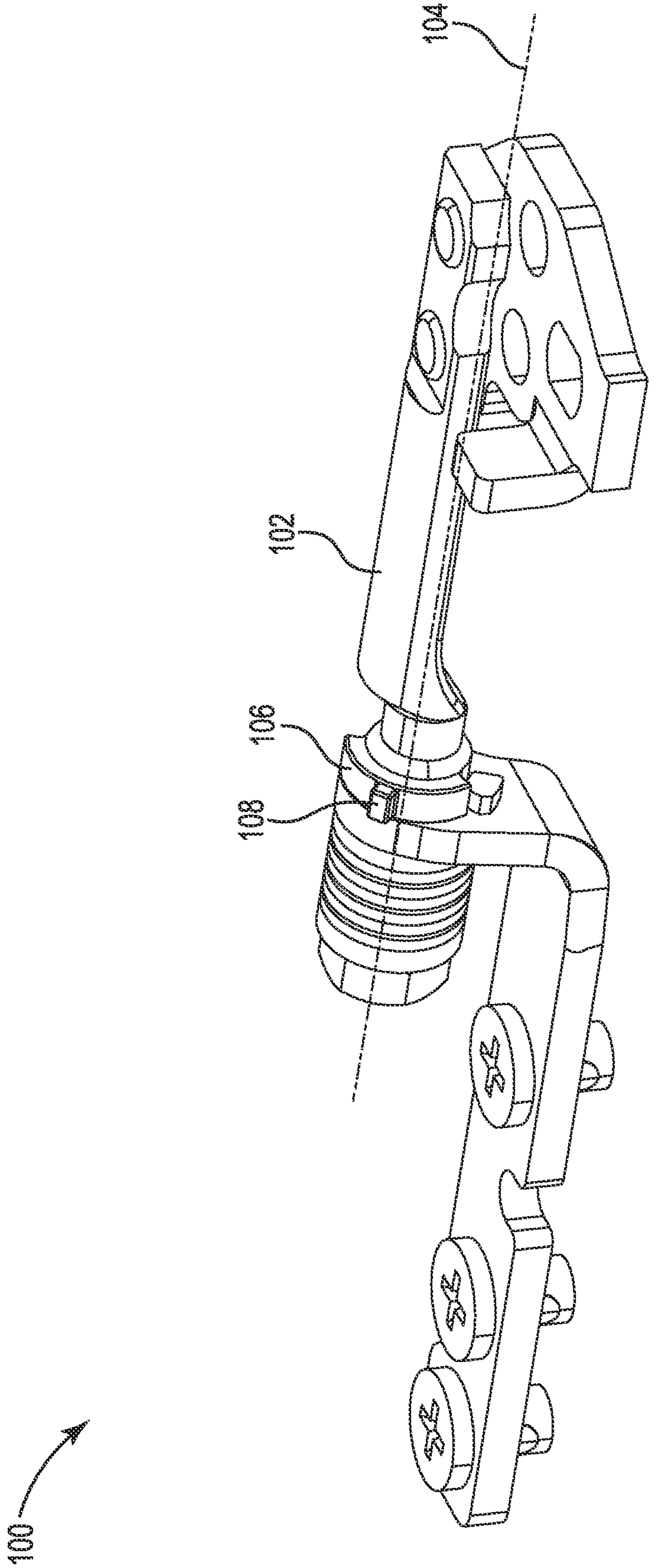
FIG. 1 is a perspective view of an example of a hinge assembly with a removable hinge cap removed consistent with the disclosure.

A user may utilize a computing device for various purposes, such as for business and/or recreational use. As used herein, the term "computing device" refers to an electronic system having a processor resource and a memory resource. Examples of computing devices can include, for instance, a laptop computer, a notebook computer, a desktop computer, an all-in-one (AIO) computer (e.g., a computing device in which computing hardware and a display device are included in a single housing), among other types of computing devices.

In some examples, the computing device includes a display device to display images generated by the computing device (or another computing device connected to the display device) and/or to allow the user to interact with the computing device. As used herein, the term "display device" refers to an output device that includes a display area that displays information provided by an electrical signal in a visual and/or tactile form. As used herein, the term "display area" refers to an area of a display device that displays information. For example, a computing device can include a display device having a display area that can display information such as text, videos, and/or images, as a result of an electrical signal provided to the display from the computing device. In some examples, the display device is utilized to display the user interface that allows the user to interact with the computing device and/or instruct the computing device to perform particular functions.

In some computing devices, the display device may rotate relative to other portions of the computing device. For example, a display device may be included in a display housing and an input device (e.g., a keyboard, trackpad, etc.) may be included in a different housing. The computing device may be designed to allow for the display housing to rotate relative to the different housing to allow the computing device to be positioned in various orientations (e.g., clamshell orientation, tent orientation, tablet orientation, book orientation, a laptop orientation, etc.)

To allow for the rotation of the different housings, the computing device can utilize a hinge assembly. As used herein, the term "hinge assembly" refers to a group of parts comprising a jointed device to allow two objects to be rotated relative to each other. For example, the hinge assembly can allow the display housing to rotate relative to the other housing.

Certain display housings and display devices may be designed to have thin bezels in order to satisfy aesthetic design preferences. In previous approaches, screws that were covered with rubber covers were utilized for connecting a hinge cover with a housing. However, such an approach leaves the rubber covers visible to a user, which does not satisfy aesthetic design preferences. In some previous approaches, snaps were utilized for connecting a hinge cover with a housing. However, snaps utilize a large amount of space resulting in system dimension impacts that exceeded design specifications (e.g., the device is too large). Further, with either of the previous approaches, assembly adhesive was utilized that covered fasteners connecting the hinge cover with the housing. As a result, the hinge assembly would not be accessible after the display housing of the computing device was assembled. Since the hinge assembly can include and/or connect with parts of the computing device, such as a display device, touch sensor, display device cover glass, camera, hinge, hinge cap, bezel, time of flight (TOF) sensors, color sensors, microphones, antennas, motion sensors, magnets, etc., if such a part failed, the entire hinge assembly had to be replaced. Without serviceability of parts included in/connected to the hinge assembly, replacement of the hinge assembly across computing devices in a marketplace can result in significant costs for a manufacturer.

Removable hinge caps according to the disclosure can allow for a hinge assembly that is accessible after the display housing of the computing device is assembled. Utilizing a locking cam, a hinge cap can be removed from the hinge assembly, allowing for access to various parts included in/connected to the hinge assembly. Such access can allow for service and/or replacement of the various parts without having to replace the entire hinge assembly, resulting in lower service costs while also satisfying aesthetic design preferences, as compared with previous approaches.

FIG. 1 is a perspective view of an example of a hinge assembly 100 with a removable hinge cap removed consistent with the disclosure. As illustrated in FIG. 1, the hinge assembly 100 can include a hinge bar 102 and a lock cam 106.

As illustrated in FIG. 1, the hinge assembly 100 can include a hinge bar 102. As used herein, the term "hinge bar" refers to a piece of material used to enable two objects to be rotated relative to each other. For example, the hinge bar 102 can be utilized to allow a display housing to rotate relative to another housing, as is further described herein.

The hinge bar 102 can include a rotation axis 104. As used herein, the term "axis" refers to a line about which a rotating body turns. For example, the hinge bar 102 can rotate about the rotation axis 104 in a clockwise and/or counterclockwise direction.

The hinge assembly 100 can further include a lock cam 106. As used herein, the term "cam" refers to a rotatable disk having an irregular form. The lock cam 106 can be located coaxially with the rotation axis 104 of the hinge bar 102. Accordingly, the lock cam 106 can be rotatable about the rotation axis 104 to different positions to allow or prevent translation of a removable hinge cap, as is further described herein.

The lock cam 106 can include a protrusion 108. As used herein, the term "protrusion" refers to a piece of material that projects from another piece of material. The protrusion 108 can be, for example, a projection of material from an outer circumferential surface of the lock cam 106. The protrusion 108 can extend from the surface (e.g., the outer circumferential surface) of the lock cam 106 at an angle substantially perpendicular to the rotation axis 104. As used herein, the term "substantially" intends that the characteristic does not have to be absolute but is close enough so as to achieve the characteristic. For example, "substantially perpendicular" is not limited to absolute perpendicular. For instance, the protrusion 108 can be within 0.5°, 1°, 2°, 5°, etc. of absolutely perpendicular to the rotation axis 104.

Although not illustrated in FIG. 1, the hinge assembly can include a removable hinge cap. The removable hinge cap can cover a portion of the hinge bar 102 and the lock cam 106. The removable hinge cap can include a lock flange, where the protrusion 108 can be located adjacent to the lock flange to prevent translation of the removable hinge cap relative to the hinge bar 102 when the lock cam is in a lock position, as is further described herein.

Figure 2:
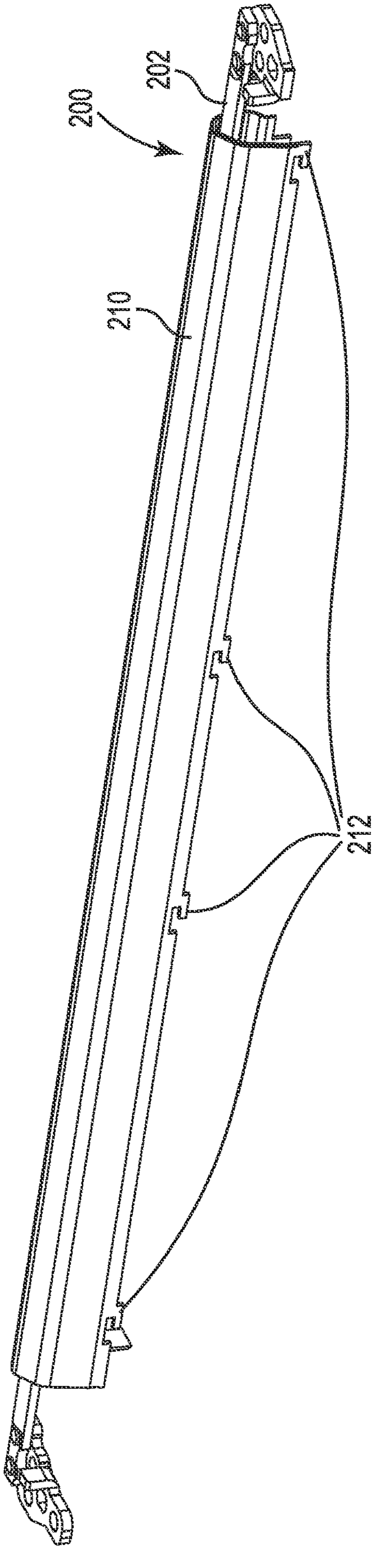
FIG. 2 is a perspective view of an example of a hinge assembly including a removable hinge cap consistent with the disclosure.

FIG. 2 is a perspective view of an example of a hinge assembly 200 including a removable hinge cap 210 consistent with the disclosure. As illustrated in FIG. 2, the hinge assembly can include the hinge bar 202 and the removable hinge cap 210. Although not illustrated in FIG. 2, the hinge assembly can further include a lock cam having a protrusion, as previously described in connection to FIG. 1.

As illustrated in FIG. 2, the hinge assembly 200 can include a removable hinge cap 210. As used herein, the term "hinge cap" refers to an object that conceals a hinge and its associated components. For example, the removable hinge cap 210 can cover a portion of the hinge bar 202 and the lock cam and its protrusion.

The removable hinge cap 210 can include sliding hooks 212. As used herein, the term "sliding hook" refers to an angled piece of material to engage with another object. For example, the sliding hooks 212 can be slidably received by a housing of a computing device (e.g., not illustrated in FIG. 2). The sliding hooks 212 can prevent vertical translation of the removable hinge cap 210 when the sliding hooks 212 are engaged with the housing, as is further described in connection with FIG. 7.

Additionally, as illustrated in FIG. 2, the hinge bar 202 can include a complementary hinge bar located on an opposite side of the removable hinge cap 210. The complementary hinge bar can be located on an opposite side of the removable hinge cap 210 as the hinge assembly 200. Both the hinge bar 202 and the complementary hinge bar can be utilized to allow for rotation of a display device when the hinge bar 202 and the complementary hinge bar are connected to the display device.

Figure 3:
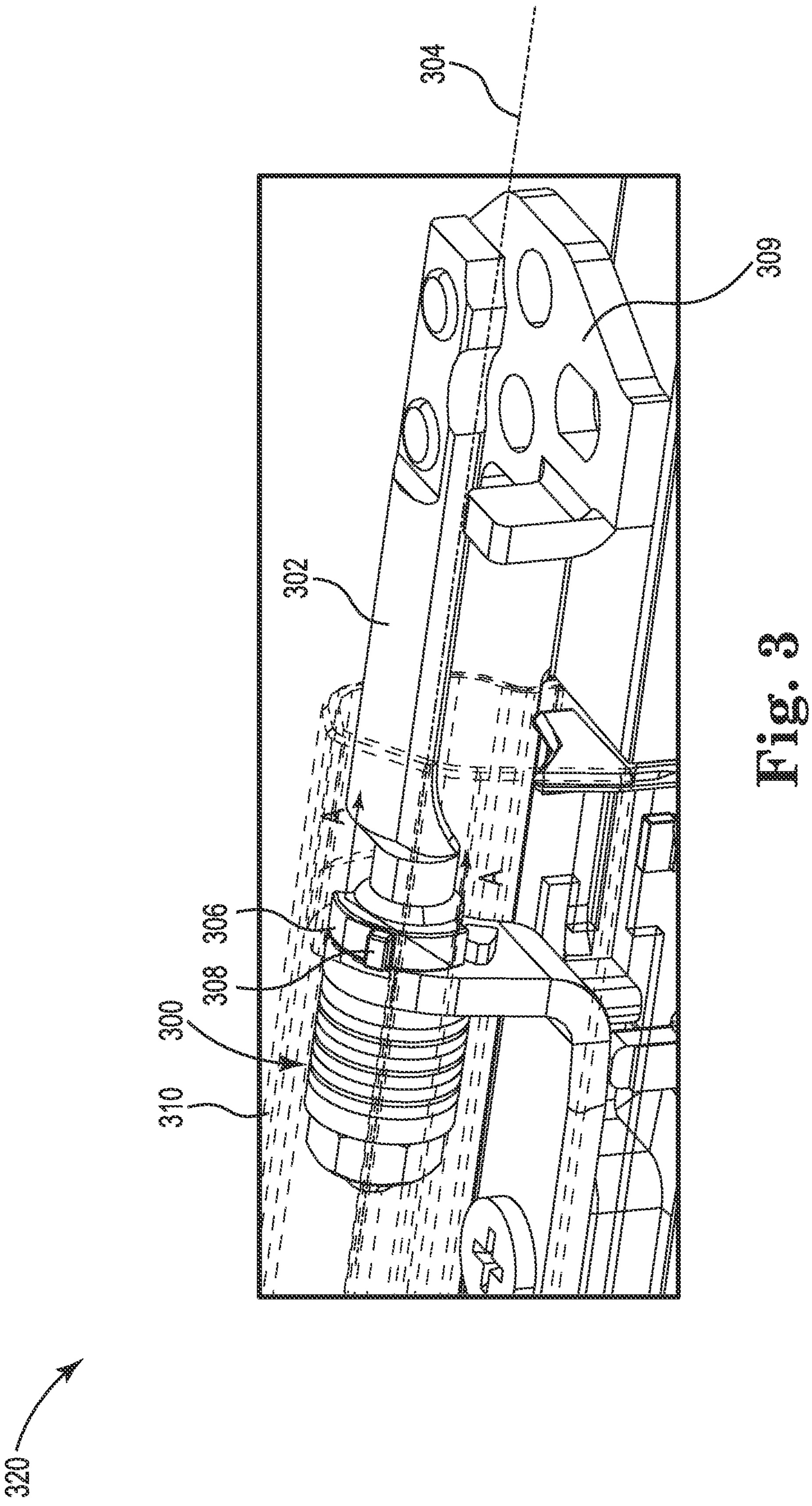
FIG. 3 is a perspective view of a portion of a computing device and a hinge assembly consistent with the disclosure.

FIG. 3 is a perspective view of a portion of a computing device 320 and a hinge assembly 300 consistent with the disclosure. As illustrated in FIG. 3, the hinge assembly 300 includes a hinge bar 302 having a rotation axis 304, a lock cam 306, a removable hinge cap 310, and an attachment mechanism 309.

An attachment mechanism 309 can be connected to the hinge bar 302. As used herein, the term "attachment mechanism" refers to a device to facilitate a connection to another object. For example, the attachment mechanism 309 can connect to a housing of the computing device 320 and can allow for the display device to rotate relative to the housing of the computing device 320. As illustrated in FIG. 3, the attachment mechanism 309 is located outside of the removable hinge cap 310 to allow for attachment to the housing when the removable hinge cap 310 is connected to the computing device 320.

As illustrated in FIG. 3, the attachment mechanism 309 can be a flange. As used herein, the term "flange" refers to an object to facilitate contact and/or connection with another object. For example, the flange can include various apertures to allow for connection to a housing via various fasteners, such as threaded fasteners (e.g., bolts and nuts, screws, etc.), clips, hooks, etc.

While the attachment mechanism 309 is described above as being a flange, examples of the disclosure are not so limited. For example, the attachment mechanism 309 can be any other object to facilitate a connection between the hinge assembly 300 and a housing.

As shown in FIG. 3, the section-line "A-A" is located through the lock cam 306 and protrusion 308. The section-view indicated by section-line "A-A" is shown in FIG. 4.

Figure 4:
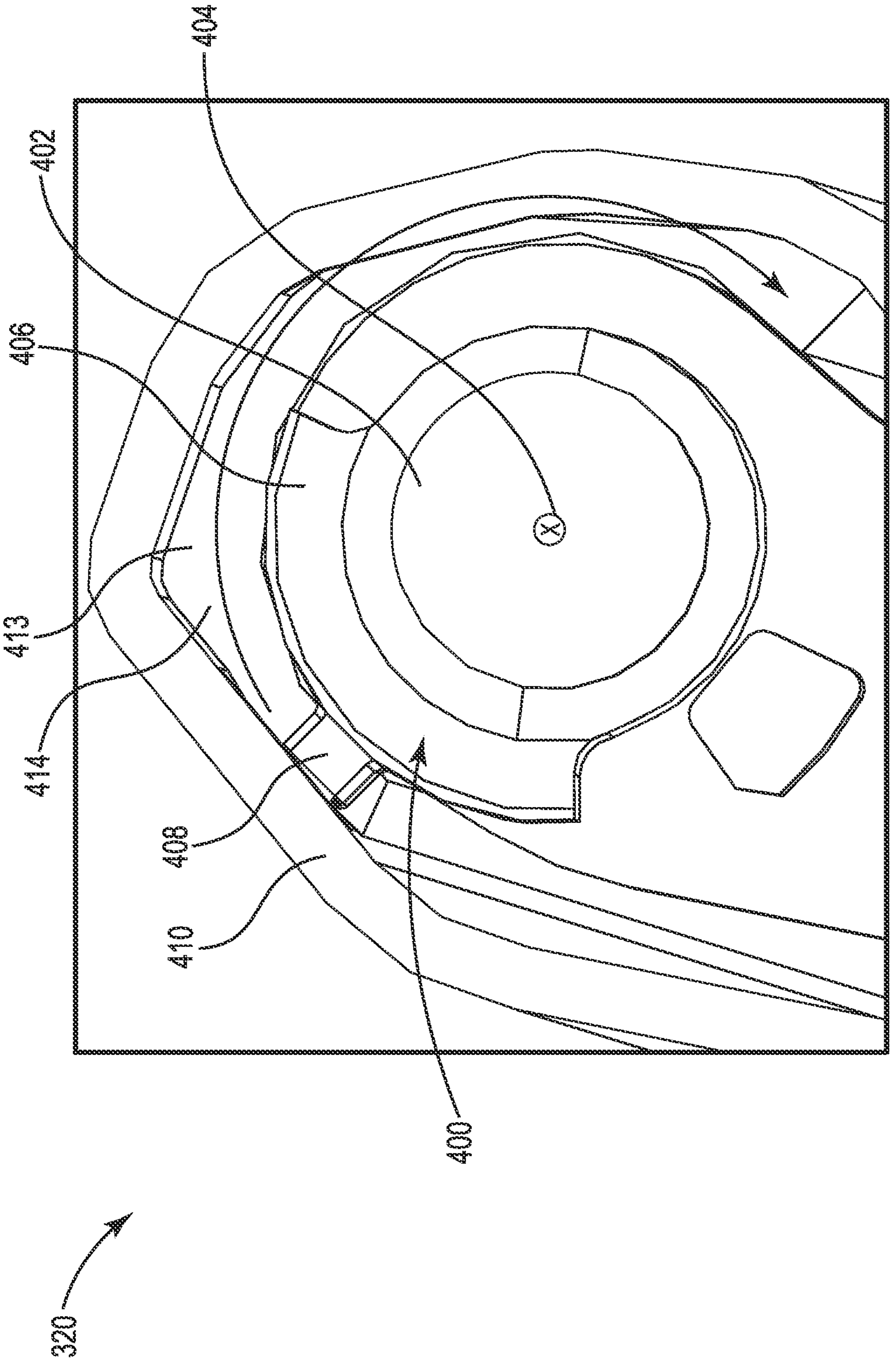
FIG. 4 is a side-section view of an example of a computing device and a hinge assembly with a lock cam in a lock position consistent with the disclosure.

FIG. 4 is a side-section view of an example of a computing device 420 and a hinge assembly 400 with a lock cam 406 in a lock position consistent with the disclosure. As illustrated in FIG. 4, the hinge assembly 400 includes a hinge bar 402 having a rotation axis 404, a lock cam 406, and a removable hinge cap 410.

The removable hinge cap 410 can include a lock flange 413. The lock flange 413 can be utilized in combination with the protrusion 408 of the lock cam 406 to prevent translation of the removable hinge cap 410 when the lock cam 406 is in a lock position, as is further described herein.

The lock flange 413 can include a lock surface 414. As used herein, the term "lock surface" refers to a face of an object to prevent motion of the object. As illustrated in FIG. 4, the protrusion 408 of the lock cam 406 can be located adjacent to the lock surface 414. Accordingly, as illustrated in FIG. 4, the lock cam 406 can be in a lock position. As used herein, the term "lock position" refers to an orientation of an object that substantially prevents motion of another object. For example, the protrusion 408 is located adjacent to the lock surface 414 when the lock cam 406 is in the lock position to prevent lateral translation of the removable hinge cap 410 (e.g., in a direction along the rotation axis 404, which is in a direction "out" of the page, as oriented in FIG. 4). In other words, when the lock cam 406 is in the lock position (e.g., as illustrated in FIG. 4), the protrusion 408 is located adjacent to the lock surface 414 to prevent translation of the removable hinge cap 410, as the lock surface 414 would contact the protrusion 408.

When the lock cam 406 is in the lock position, the hinge bar 402 is rotatable through a range of angular rotation where the protrusion 408 remains located adjacent to the lock surface 414 through the range of angular rotation. For example, when the hinge bar 402 is rotated (e.g., around the rotation axis 404 as indicated by the arrow in FIG. 4), the protrusion 408 remains located adjacent to the lock surface 414 through the range of angular rotation of the hinge bar 402 and lock cam 406. The range of angular rotation can include, for example, a range of 0° (e.g., an initial position as illustrated in FIG. 4) to 180°. Such a range of angular rotation can correspond to a display device rotating from 0° (e.g., a "closed" position of the computing device) to 180° (e.g., in a clockwise direction, as oriented in FIG. 4), where the angular rotation range from greater than 0° to 180° corresponds to an "open" position of the computing device. For example, a user may rotate the display device from a closed position (e.g., with the hinge bar 402/lock cam 406 being at a 0° position) to an open position (e.g., with the hinge bar 402/lock cam 406 being at a 110° position) while the protrusion 408 remains located adjacent to the lock surface 414.

In response to rotation of the hinge bar 402 relative to the removable hinge cap 410 through a range of angular rotation, the lock cam 406 remains in the lock position. Accordingly, the removable hinge cap 410 is not removable from the computing device through the range of angular rotation of the hinge bar 402/lock cam 406.

Figure 5:
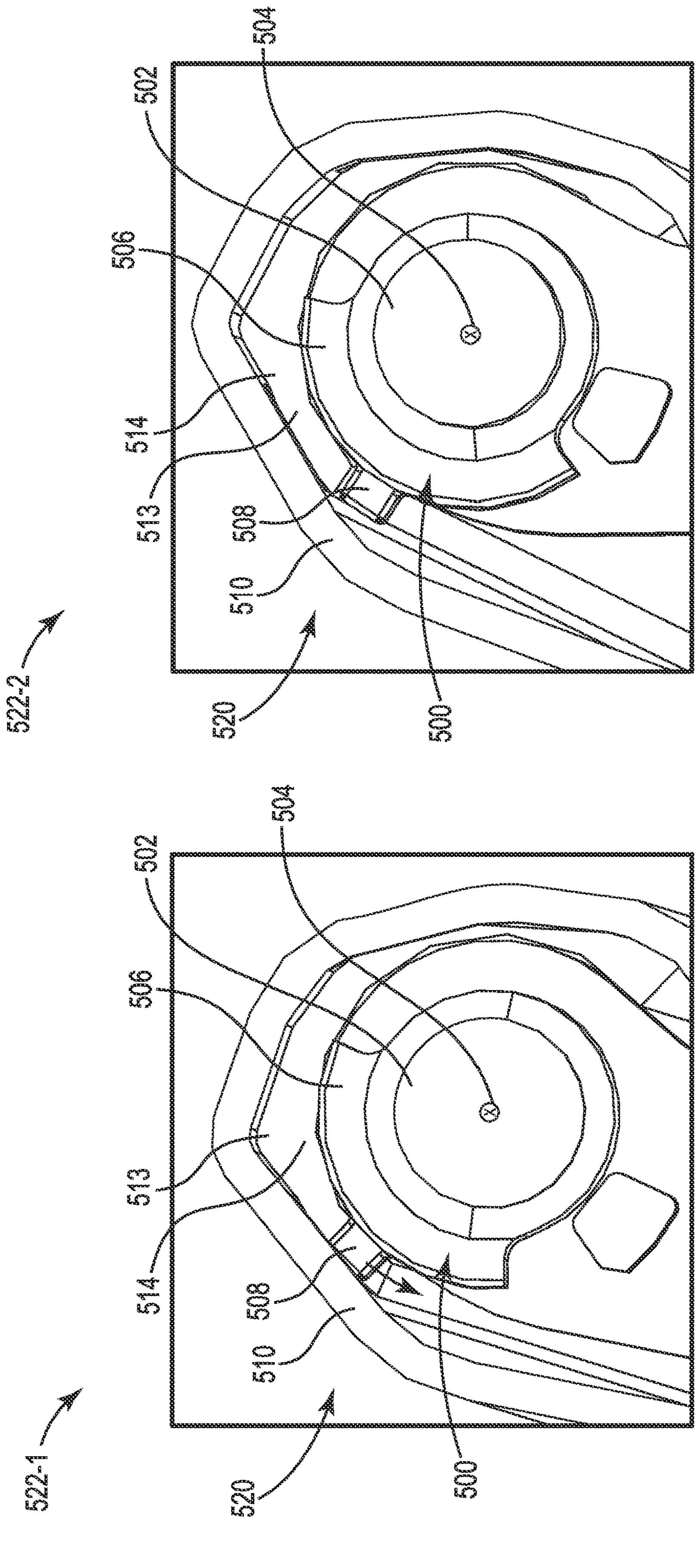
FIG. 5 is a side-section view of an example of a computing device and a hinge assembly with a lock cam moved from a lock position to an unlock position consistent with the disclosure.

FIG. 5 is a side-section view of an example of a computing device 520 and a hinge assembly 500 with a lock cam 506 moved from a lock position to an unlock position consistent with the disclosure. As illustrated in FIG. 5, the hinge assembly 500 includes a hinge bar 502 having a rotation axis 504, a lock cam 506, and a removable hinge cap 510.

In some instances, the hinge bar 502 is rotatable to a particular rotation angle outside the range of angular rotation such that the lock cam 506 is in an unlock position. As used herein, the term "unlock position" refers to an orientation of an object that allows motion of another object. For example, the lock cam 506 can be in an unlock position that allows the removable hinge cap 510 to translate relative to the hinge bar 502, as is further described herein.

As illustrated at 522-1, the lock cam 506 is in the lock position. For example, the protrusion 508 is located adjacent to the lock surface 514 to prevent lateral translation of the removable hinge cap 510.

As mentioned above, the hinge bar 502 can be rotated to a particular rotation angle outside the range of angular rotation. For example, the range of angular rotation (e.g., as previously described in connection with FIG. 4) can be 0°-180°. However, the hinge bar 502 can, in some examples, be rotated to an angle outside the range of angular rotation, such as −20° (e.g., in a counterclockwise direction as oriented in FIG. 5). In response to rotation of the hinge bar 502 to a particular rotation angle outside the range of angular rotation, the lock cam 506 can be in an unlock position, as is further described herein.

The hinge bar 502 may not be rotatable to the angle outside the range of angular rotation in all instances. For example, when the housing (e.g., not illustrated in FIG. 5) is connected to the attachment mechanism of the hinge assembly 500, the housing prevents rotation of the hinge bar 502 to the angle outside the range of angular rotation because the housing of the computing device (e.g., a keyboard housing) prevents such rotation. However, when the attachment mechanism of the hinge assembly 500 is not connected to the housing, the hinge bar 502 can be rotatable to the angle outside the range of angular rotation, as is further described in connection with FIG. 6.

When the hinge bar 502 is rotated to the angle outside the range of angular rotation, the lock cam 506 can be in the unlock position. For example, as illustrated at 522-2, the lock cam 506 is in the unlock position where the protrusion 508 is oriented away from the lock flange 513. When the protrusion 508 is oriented away from the lock flange 513 (e.g., when the lock cam 506 is in the unlock position), the removable hinge cap 510 is translatable relative to the hinge bar 502. That is, when the lock cam 506 is in the unlock position, the removable hinge cap 510 is removable from the computing device 520. Such an approach can prevent a user of the computing device from easily removing the removable hinge cap 510, but allow for servicing and/or replacement of parts of the hinge assembly 500.

Figure 6:
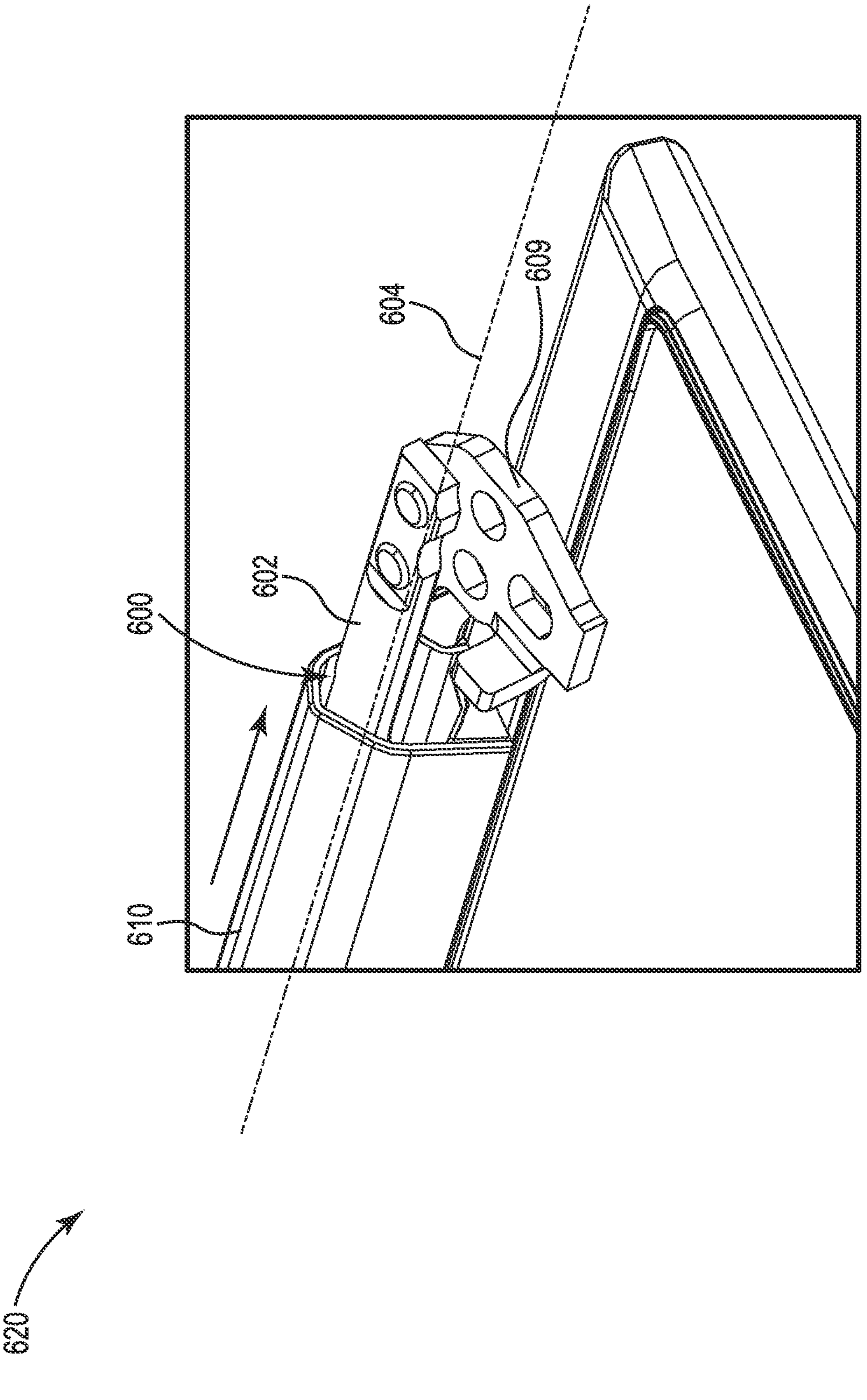
FIG. 6 is a perspective view of an example of a computing device and a hinge assembly having a hinge bar at a particular rotation angle consistent with the disclosure.

FIG. 6 is a perspective view of an example of a computing device 620 and a hinge assembly 600 having a hinge bar 602 at a particular rotation angle consistent with the disclosure. As illustrated in FIG. 6, the hinge assembly 600 includes a hinge bar 602 having a rotation axis 604, a removable hinge cap 610, and an attachment mechanism 609.

As previously described in connection with FIG. 5, the hinge bar 602 may not be rotatable to the particular rotation angle in all instances. However, as illustrated in FIG. 6, the hinge bar 602 is rotatable to the particular rotation angle when the housing is not connected to the attachment mechanism 609. Such rotation of the hinge bar 602 is possible when the housing is not connected to the attachment mechanism 609 as the housing of the computing device 620 does not obstruct rotation of the hinge bar 602. Accordingly, the removable hinge cap 610 is removable from the computing device 620 by translating the removable hinge cap 610 relative to the hinge bar 602 in a direction indicated by the arrow in FIG. 6.

Figure 7:
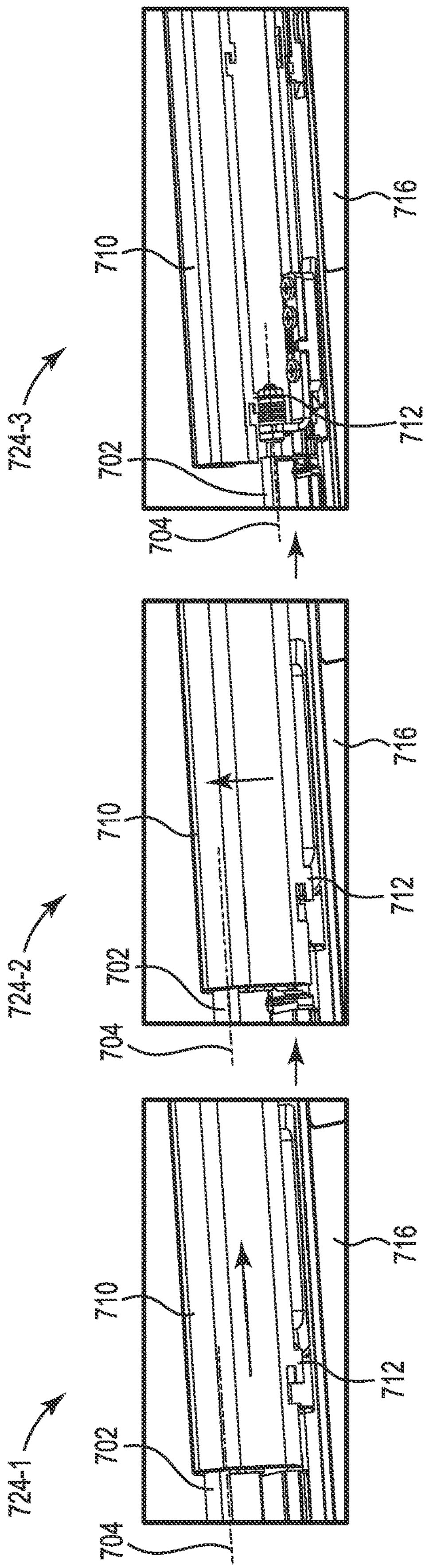
FIG. 7 is a perspective view of an example of a removable hinge cap being removed from a housing consistent with the disclosure.

FIG. 7 is a perspective view of an example of a removable hinge cap 710 being removed from a housing 716 consistent with the disclosure. As used herein, the term "housing" refers to an outer shell of a device. For example, the housing 716 can be, for example, a computing device housing making up a portion of a computing device. The housing 716 can be a housing that may include various components of the computing device, such as a motherboard, a power supply, storage drives (e.g., floppy drives or optical drives such as CD-ROM, CD-RW, DVD-ROM, etc.), memory, a hard disk, a video card, a sound card, input devices (e.g., a keyboard, trackpad, etc.), among other components.

As previously described above, in response to rotation of the hinge bar 702 to a particular rotation angle, a protrusion of a lock cam is oriented away from a lock flange of the removable hinge cap 710 such that the removable hinge cap 710 is translatable along the rotation axis 704. For example, at 724-1, the removable hinge cap 710 is in a fixed position. The sliding hook 712 can be engaged with (e.g., slidably received by) the housing 716. At 724-1, the sliding hook 712 can prevent substantial vertical translation of the removable hinge cap 710 with respect to the rotation axis 704/housing 716 when the lock cam is in the lock position. When the lock cam 706 is in the unlock position, the removable hinge cap 710 is translatable along the rotation axis 704 from the fixed position at 724-1 (e.g., as indicated by the arrow in FIG. 7) to a removable position at 724-2.

At 724-2, the hinge cap 710 has been laterally translated along the rotation axis 704 to a removable position. In the removable position, the sliding hook 712 is interfaced with the housing 716 but is no longer engaged with the housing 716. The removable hinge cap 710 is vertically translatable with respect to the rotation axis 704/housing 716 when the lock cam is in the unlock position. Accordingly, as illustrated at 724-3, the removable hinge cap 710 is removed from the housing 716. When the removable hinge cap 710 is removed from the housing 716, components within the hinge assembly can be serviced, replaced, etc.

The process illustrated in FIG. 7 may be performed in reverse. For example, when attaching the removable hinge cap 710 to the housing, the removable hinge cap 710 may be vertically translated towards the housing 716 at 724-2. The housing 716 can receive the sliding hook 712 and at 724-2, the removable hinge cap 710 may be translated with respect to the rotation axis 704 so as to engage the sliding hook 712 with the housing 716 at 724-1. The hinge bar 702 may then be rotated from the particular rotation angle outside the range of angular rotation to a rotation angle inside the range of angular rotation. Such rotation of the hinge bar 702 can return the lock cam from the unlock position to the lock position such that the protrusion of the lock cam is located adjacent to the lock flange of the removable hinge cap 710.

Figure 8:
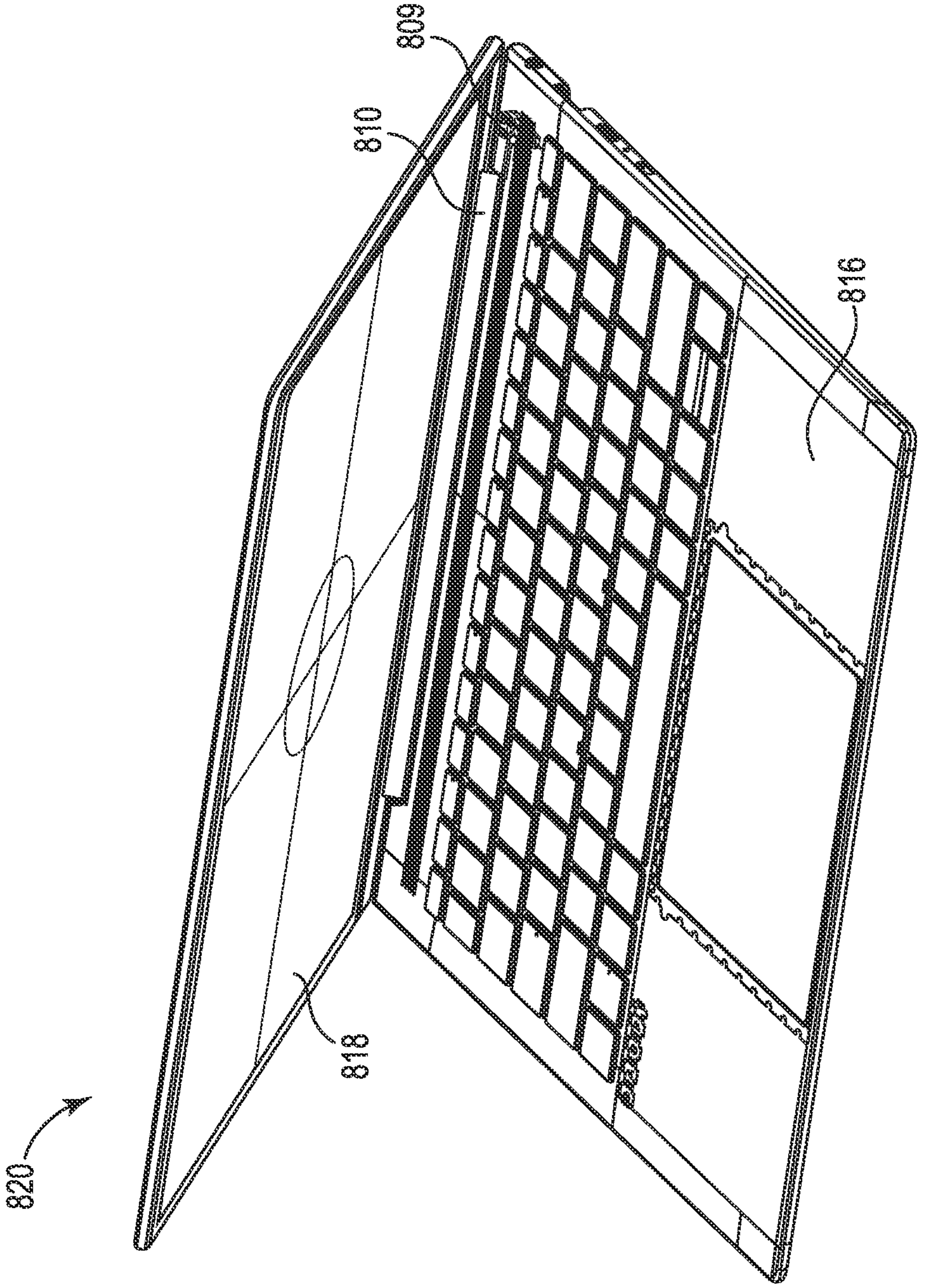
FIG. 8 is perspective view of an example of a computing device having a display device and a removable hinge cap consistent with the disclosure.

FIG. 8 is perspective view of an example of a computing device 820 having a display device 818 and a removable hinge cap 810 consistent with the disclosure. As previously mentioned in FIG. 7, the computing device 820 can include a housing 816.

The removable hinge cap 810 can cover portions of a hinge assembly. The hinge assembly can connect the display device 818 with the housing 816, can include various components of the computing device 820, and can allow rotation of the display device 818 with respect to the housing 816.

As previously described in connection with FIGS. 5 and 6, when the display device 818 is connected to the hinge assembly, the housing 816 prevents rotation of the hinge bar to the angle outside the range of angular rotation because the attachment mechanism 809 is connected to the housing 816 of the computing device 820. This can prevent a user of the computing device 820 from removing the removable hinge cap 810 during normal use of the computing device 820.

However, if a component included in the hinge assembly is to be serviced or replaced, the display device 818 can be removed from the hinge assembly and the removable hinge cap 810 can be removed from the computing device 820 utilizing the approach described above, allowing for a user (e.g., a technician) to access components within the hinge assembly for servicing. At the conclusion of such servicing, the removable hinge cap 810 can be reconnected to the housing 816 and the display device 818 can be connected to the hinge assembly, preventing the hinge bar from rotating to the particular rotation angle outside of the range of angular rotation.

Removable hinge caps according to the disclosure can allow for a hinge assembly that is accessible to certain users, as it can be disassembled after removal of a removable hinge cap. Utilizing a lock cam, the removable hinge cap can be prevented from removal during normal use of the computing device when the lock cam is in the lock position. When removal of the removable hinge cap is desired, the lock cam can be rotated to an unlocked position, allowing for access to various parts included in/connected to the hinge assembly. Such access can allow for service and/or replacement of the various parts without having to replace the entire hinge assembly, resulting in lower service costs while also satisfying aesthetic design preferences, as compared with previous approaches.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" can refer to one such thing or more than one such thing.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 202 in FIG. 2. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples and data provide a description of the method and applications, and use of the system and method of the disclosure. Since many examples can be made without departing from the spirit and scope of the system and method of the disclosure, this specification merely sets forth some of the many possible example configurations and implementations.

What is claimed is:

1. A hinge assembly, comprising:

a hinge bar including a rotation axis;

a lock cam including a protrusion, the lock cam located coaxially with the rotation axis of the hinge bar; and a removable hinge cap to cover the hinge bar and the lock cam, wherein the removable hinge cap includes a lock flange;

wherein the protrusion is located adjacent to the lock flange to prevent translation of the removable hinge cap relative to the hinge bar when the lock cam is in a lock position.

2. The hinge assembly of claim 1, wherein in response to rotation of the hinge bar relative to the removable hinge cap through a range of angular rotation, the lock cam remains in the lock position.

3. The hinge assembly of claim 2, wherein in response to rotation of the hinge bar to a particular rotation angle outside the range of angular rotation, the lock cam is in an unlock position.

4. The hinge assembly of claim 3, wherein the protrusion is oriented away from the lock flange such that the removable hinge cap is translatable relative to the hinge bar when the lock cam is in the unlock position.

5. The hinge assembly of claim 1, wherein the protrusion extends from a surface of the lock cam at an angle substantially perpendicular to the rotation axis.

6. The hinge assembly of claim 1, wherein:

the lock flange includes a lock surface; and the protrusion is located adjacent to the lock surface when the lock cam is in the lock position.

7. A computing device, comprising:

a housing; and a hinge assembly, including:

a hinge bar including a rotation axis;

a lock cam including a protrusion, the lock cam located coaxially with the rotation axis of the hinge bar; and a removable hinge cap connectable to the housing to cover the hinge bar and the lock cam, wherein the removable hinge cap includes a lock flange having a lock surface;

wherein the protrusion is located adjacent to the lock surface to prevent translation of the removable hinge cap relative to the hinge bar when the lock cam is in a lock position.

8. The computing device of claim 7, wherein in response to rotation of the hinge bar to a particular rotation angle, the protrusion is oriented away from the lock flange such that the removable hinge cap is translatable along the rotation axis of the hinge bar from a fixed position to a removable position.

9. The computing device of claim 7, wherein the removable hinge cap includes sliding hooks to connect the removable hinge cap to the housing.

10. The computing device of claim 9, wherein:

the sliding hooks prevent substantially vertical translation of the removable hinge cap with respect to the rotation axis when the lock cam is in the lock position; and the removable hinge cap is vertically translatable with respect to the rotation axis when the lock cam is in an unlock position.

11. The computing device of claim 7, wherein the housing is a computing device housing.

12. A computing device, comprising:

a housing; and a hinge assembly, including:

a hinge bar including a rotation axis;

a lock cam including a protrusion, the lock cam located coaxially with the rotation axis of the hinge bar;

a removable hinge cap connectable to the housing to cover the hinge bar and the lock cam, wherein the removable hinge cap includes a lock flange having a lock surface; and an attachment mechanism connected to the hinge bar to connect to the housing, wherein the attachment mechanism is located outside of the removable hinge cap;

wherein:

when the lock cam is in a lock position, the hinge bar is rotatable through a range of angular rotation where the protrusion remains located adjacent to the lock surface through the range of angular rotation to prevent translation of the removable hinge cap relative to the hinge bar; and the hinge bar is rotatable to a particular rotation angle outside the range of angular rotation such that the lock cam is in an unlock position where the protrusion is oriented away from the lock flange.

13. The computing device of claim 12, wherein the hinge bar is rotatable to the particular rotation angle when the housing is not connected to the attachment mechanism.

14. The computing device of claim 12, wherein in response to the housing being connected to the attachment mechanism, the housing prevents the hinge bar from rotating to the particular rotation angle.

15. The computing device of claim 12, wherein when the lock cam is in the unlock position, the removable hinge cap is removable from the computing device.

* * * * *